United States Patent [19]

Reckweg et al.

[11] Patent Number: 5,756,142
[45] Date of Patent: May 26, 1998

[54] SQUEEZABLE SPREADS

[75] Inventors: Freek Reckweg, Columbia; Michael Chiaverini, Towson, both of Md.; Martin Paul Gillis, Eden Prairie, Minn.

[73] Assignee: Van den Bergh Foods Company, Division of Conopco, Inc., New York, N.Y.

[21] Appl. No.: 55,488

[22] Filed: Apr. 30, 1993

[51] Int. Cl.⁶ .................................................. A23D 9/04
[52] U.S. Cl. ........................................ 426/603; 426/602
[58] Field of Search ........................... 426/601, 612, 426/585, 115, 602, 603

[56] References Cited

U.S. PATENT DOCUMENTS

| | | | |
|---|---|---|---|
| 3,437,492 | 4/1969 | Lensack | 426/612 |
| 4,341,812 | 7/1982 | Ward | 426/603 |
| 4,557,103 | 12/1985 | Schwartz | 426/581 |
| 4,748,041 | 5/1988 | Player | 426/613 |
| 4,769,255 | 9/1988 | Ahmed | 426/603 |
| 4,970,087 | 11/1990 | Admed | 426/583 |

FOREIGN PATENT DOCUMENTS 1333938  10/1973  United Kingdom.

*Primary Examiner*—Carolyn Paden
*Attorney, Agent, or Firm*—A. Kate Huffman

[57] ABSTRACT

A squeezable spread having a fat phase of less than 3 wt. % of a hardstock combined with about 97 to about 99% of liquid vegetable oil is described. The hardstock is a fully hardened low erucic rapeseed oil and the liquid vegetable oil is non-hydrogenated containing no solid fat at temperatures of 45° F. and above.

8 Claims, No Drawings

SQUEEZABLE SPREADS

FIELD OF THE INVENTION

The present invention relates to squeezable spreads or margarines based on a liquid vegetable oil and less than 3 wt. % of a fully hardened, low erucic acid rapeseed oil.

BACKGROUND OF THE INVENTION

Liquid oils have been used as the bulk of the fat of squeezable or liquid margarine and spread products for both nutritional and economical reasons. To provide the structural component of the spread or margarine hardstocks are needed in the form of a fat in a crystalline phase at about room temperature.

Commercial liquid margarines or spreads presently available primarily use high levels of liquid vegetable oil in an amount of 97 to about 99 wt. % of the fat phase of the composition combined with about 0.5 to about 2 wt. % of a hardstock, such as fully hardened soybean oil. Such products have a liquid i.e., pourable or free flowing texture when squeezed from a container.

Other commercial products with basically the same compositions as those described above achieved a more spread-like texture by using touch hardened vegetable oil as the major oil blend component, rather than non-hydrogenated vegetable oil.

In U.S. Ser. No. 07/680,186 filed Apr. 3, 1991 edible fats based on hardstocks which reduce the level of tropical fats and avoid the use of directed interesterification are described. The hardstocks comprise around 27% behenic acid, 35% palmitic acid and 35% stearic acid. Suitable sources of stearic include low erucic rapeseed oil. However, the resulting products incorporating these hardstocks still contain some trans fatty acids and a high percentage of the hardstock component and are not of suitable texture to allow squeezing through a narrow orifice as used in squeezable or liquid margarine and spread containers.

SUMMARY OF THE INVENTION

It is an object of the present invention to provide a squeezable spread product based on liquid vegetable oil and having improved textural properties through the use of fully hardened low erucic acid rapeseed oil in an amount of less than 3 wt. % of the total composition.

It is further an object to provide a squeezable spread product which is free of trans fatty acids and has good stability upon standing.

A further object of the invention is the production of a squeezable spread-like product which is consistently reproducible and avoids the variability problems of prior art products based on the use of touch hardened fats.

DETAILED DESCRIPTION OF THE PREFERRED EMBODIMENTS

The products of the invention have a smooth texture, rich mouthfeel and excellent stability upon standing at room temperature.

The products may be squeezable margarines, and other squeezable spread products. The products may also be flavored to simulate dairy flavored products such as yogurt and sour cream dips.

The squeezable products of the invention must exhibit a preferred texture. The term "preferred texture" means that the squeezable products of the invention exhibit spread-like properties upon dispensing from a container. These properties include smooth texture, a plastic consistency and viscosity such that the dispensed products retain their shape and do not flow freely under their own weight as liquids.

The viscosity of the compositions should fall within the range of about 120,000 to about 160,000 centipoises when measured 24 hours after production, at 41° F., with a type D spindle rotated at 5 rpm using a Brookfield type Viscometer. The preferred viscosity range is between about 120,000 and 140,000 centipoises.

Liquid vegetable oils which may be included in the composition are the usual vegetable oils such as soybean oil, corn oil, cottonseed oil, peanut oil, safflower oil, sunflower oil, and rapeseed oil. The preferred fats are those which do not contain solid fat at temperatures of 45° F. and above. Such preferred fats include non-hydrogenated liquid vegetable oils selected from the group of sunflower oil, soybean oil, corn oil, rapeseed oil and mixtures thereof.

The fat selected should provide a squeezable product with good textural qualities at 35° to 75° F., preferably 45° to 55° F.

The source of the hardstock fat of the composition is a fully hardened low erucic acid rapeseed oil, also known as canola oil. The hardstock is present in an amount of less than 3 wt. % fat based on the total composition and preferably 0.3 to 1.5 wt.%.

It is observed that hardstock sources such as fully hardened soybean oil do not provide a desirable textural property of the composition and are outside the scope of the invention. Without being limited to theory, it is believed that the fine crystal size of fully hardened low erucic acid rapeseed provides specific properties so that the product may be based mostly on liquid vegetable oil and very low quantities of hardstock, while still providing the preferred textural qualities of a squeezable spread.

Emulsifiers used in the fat phases of the spreads of the invention include saturated monoglycerides, diglycerides and lecithin. Preferably the emulsifiers are present in an amount of 0.1% to 0.5 wt. % of the composition.

The spreads of the invention may comprise a number of optional ingredients to provide desirable flavor and flavor with materials known in the art. Coloring agents which are suitable include beta carotene, annatto, turmeric, caramel color, paprika and FD&C dyes. Typically the colors will be dissolved or dispersed in the fat phase or the water phase to expedite.

If desired, the compositions may also comprise dairy and non-dairy ingredients. The amount of the ingredient is selected depending on the effect of the dairy protein on mouthfeel and sourness. The dairy protein can be derived from any dairy source, such as whole milk, skimmed milk, cultured buttermilk, buttermilk powder, skimmed milk powder, yogurt, quark, frommage frais, cottage cheese, whey, whey powder, butter, etc.

Alternatively, protein of vegetable origin like soybean extracted proteins may also be incorporated.

Flavors which are suitable for the invention include sodium chloride, butter flavors, fruit flavors, spices, nut flavors, vegetable flavors, herbs, dairy flavors, distilled beverage flavors, cheese flavors, seafood flavors, meat flavors, candy flavors, essential oils, botanical extracts, oleo resins and other natural synthetic flavors. Among the flavors suitable for a butter flavors desired are lactones, lipolyzed butter oils and starter distillates, diacetyl, 2-octanone, and other ketones; butyric acid, hexanoic acid and other free fatty acids; esters of butyric acids, delta-hydroxy acids and their glycerol esters and mixtures of any of these with other known dairy, butter or like flavors or flavor notes.

Preferably the level of flavoring materials is less than 0.5 wt. %, more preferably 0.01 to 0.2 wt. %. Preferably the level of salt (sodium chloride) is from 0 to 4 wt. %, more preferred 0.1 to 3 wt. %, most preferred 0.5 to about 2 wt. %.

Colors are present in the composition in an amount of less than 1 wt. %, preferably 0.001 to 0.1 wt. %.

To control microbiological and oxidative deterioration, preservatives are incorporated in the composition. To control mold and yeast growth, the products may contain benzoic acid, sorbic acid, phosphoric acid, lactic acid and the soluble salts of these and other like materials.

Preferred anti-microbials are potassium sorbate, sodium sorbate, potassium benzoate, sodium benzoate and phosphoric acid, preferably incorporated at a level of 0 to 4 wt. %, more preferably 0.01 to 2 wt. %. Especially preferred is potassium sorbate.

Acidifiers may be incorporated to maintain the pH of the aqueous phase of the product at a desirable level, preferably from 3 to 10, more preferably from 3.5 to 7. Suitable acidifiers are lactic acid and citric acid incorporated at a level of about 0.01 to 1 wt. %, preferably 0.01 to 0.5 wt. %.

If desired, a chelating agent such as EDTA, its salts or the like can be employed to tie up metal ions which may otherwise interact with one or more of the ingredients in an undesirable manner.

The ingredients of the compositions may be formed into a squeezable spread by any conventional process known in the art to form a spread which is squeezable at 40° F. More particularly, the aqueous phase is formed by heating the water to a temperature in a range from 70° to about 100° F. and then adding the dry aqueous phase ingredients to form a mixture. The mixture is pasteurized by heating to a temperature of about 190° F. The mixture is then cooled to about 100° F. and an acidifier is added to bring the pH of the product to the desired level.

The oil phase is prepared by blending some of the liquid vegetable oil with the emulsifiers in a 4:1 ratio with heat in a temperature range of from about 150° to about 170° F. under agitation. In a separate vessel, some of the vegetable liquid oil is blended with the hardstock fraction in a 4:1 ratio of vegetable oil to hardstock under the same heat and agitation conditions as with the emulsifiers. Some of the vegetable liquid oil is blended with lecithin in a 2:1 ratio of vegetable oil to lecithin and heated to a temperature range of from about 110° to 140° F., preferably 125° to 135° F. under agitation.

The mixtures of vegetable oil with emulsifiers, hardstock and lecithin are then added to the remainder of the liquid vegetable oil fraction and heated to a temperature range of 110° to about 140° F., preferably 110° to 125° F. to form the oil phase. The phase is agitated during heating.

Premixing of the aqueous and oil phase to form an emulsion is accomplished by adding the aqueous phase to the complete oil phase under continuous agitation.

The phases are agitated to homogenize the aqueous and oil phases and the optional ingredients may be added during the homogenization agitation.

The emulsion mixture passes to a suitable heat exchanger where it is cooled. A combination of such cooling units can suitably be employed as well. Such a process can, for example, suitably be carried out in a Votator® one or more surface scraped heat exchangers, optionally combined with one or more stirred, so-called crystallizers.

The following examples illustrate, without limitation, the present invention.

EXAMPLE 1

The following liquid margarine product was prepared:

| Ingredients | Wt. % in Product |
| --- | --- |
| Soybean Oil | 62.43 |
| Canola Stearine[1] | 0.85 |
| Saturated Monoglycerides | 0.30 |
| Lecithin | 0.11 |
| Water | 33.07 |
| Sodium chloride | 2.01 |
| Whey Powder | 1.06 |
| Potassium Sorbate | 0.10 |
| Citric Acid | 0.05 |
| EDTA | 0.007 |
| Flavor | 0.02 |
| Color | 0.006 |
| Total | 100.00 |

[1]Canola stearine is a fully hardened low erucic acid rapeseed oil supplied by Van den Bergh Foods of Lisle, Illinois.

The whey powder, sodium chloride, EDTA and potassium sorbate were added to the water at a temperature of 100° F. and heated to a temperature of 190° F. to pastuerize the solution. The solution was then cooled to 100° F. and citric acid was added at a 10% dilution to obtain a pH of 5.0 of the aqueous phase.

A mixture of saturated monoglycerides and soybean oil in a ratio of 4:1 soybean to monoglycerides was formed and heated to 165° F. with agitation. Another blend of liquid soybean oil and canola stearine was formed in a ratio of 4:1 vegetable oil to canola oil and the mixture was heated to 165° F. with agitation. A third oil blend of liquid soybean oil to lecithin in a ratio of 2:1 was formed and heated to 130° F. with agitation. The mixtures of monoglycerides, canola stearine, lecithin and liquid soybean oil were added to the remaining liquid soybean oil component and heated to a temperature of 120° F. with agitation for 10 minutes to form a homogenized oil phase. The complete aqueous phase, color and flavor were added during the agitation.

The homogenized composition was then passed through scrapped surface heat exchangers and pin mixers (crystallizers) and cooled to a final temperature in the range of 40° F. to 50° F. The cooled composition was then filled onto squeeze bottles and stored at 41° F. (5° C.).

The composition was evaluated after 24 hours storage, and it was observed that the composition had good appearance, mouthfeel and flavor properties. It was also observed that the squeezable spread composition had good textural properties and a viscosity of 136,000 centipoise (cps) measured on a Brookfield Viscometer using D-spindle rotating at 5 RPM.

EXAMPLE 2

A composition containing fully hardened soybean oil rather than canola stearine (fully hardened low erucic acid rapeseed oil) as the hardstock was prepared according to the procedure of Example 1 as follows:

| Ingredients | Wt. % in Product |
| --- | --- |
| Soybean Oil | 62.43 |
| Soybean Oil (Fully hardened) | 0.85 |
| Saturated Monoglycerides | 0.30 |
| Lecithin | 0.11 |
| Water | 33.07 |
| Sodium chloride | 2.01 |
| Whey Powder | 1.06 |
| Potassium Sorbate | 0.10 |
| Citric Acid | 0.05 |
| EDTA | 0.007 |
| Flavor | 0.02 |
| Color | 0.006 |
| Total | 100.00 |

The textures and viscosities of this composition were compared to those of the compositions of Example 1.

It was observed that the composition containing fully hardened soybean oil had a more 'liquid' texture and a viscosity of 101,000 centipoises (cps) measured at 5° C. after 24 hours.

It was observed that compositions according to the invention based on fully hardened low erucic acid rapeseed oil as the hardstock component had a viscosity value (136,000 cps) greater than the composition containing fully hardened soybean oil as the hardstock component (101,000 cps). It was further observed that the texture of the inventive compositions was greatly improved over those compositions of example 2 above, being more spread-like instead of liquid.

We claim:

1. A squeezable spread comprising
   (a) about 0.1 to about 3 wt. % of a fully hardened low erucic acid rapeseed oil;
   (b) about 60 to about 80 wt. % of a liquid vegetable oil component; and
   (c) an aqueous phase
and the squeezable spread having a plastic consistency, being squeezable at about 35° F. to about 40° F. and having a viscosity such that the squeezable spread retains its shape and does not flow freely under its own weight.

2. A squeezable spread according to claim 1 wherein the fully hardened low erucic acid rapeseed oil component is present in an amount of 0.3 to 1.5 wt. % of the total composition.

3. A squeezable spread according to claim 1, wherein the liquid vegetable oil component is present in an amount of about 60 to about 70 wt. % of the composition.

4. A squeezable spread according to claim 1 comprising a dairy ingredient selected from the group of whole milk, semi-skimmed milk, skimmed milk, cultured buttermilk, buttermilk powder, skimmed milk powder, yogurt, quark, frommage frais, cottage cheese, whey powder, butter and mixtures thereof.

5. A squeezable spread according to claim 1, wherein the spread has a Brookfield viscosity of between 120,000 and 160,000.

6. A squeezable spread according to claim 1, further comprising 0.1% to 0.5 wt. % of an emulsifier selected from the group consisting of saturated monoglycerides, diglycerides and lecithin.

7. A squeezable spread having an aqueous phase and having a fat phase comprising:
   (a) about 0.3 to about 1.5 wt. % of a fully hardened low erucic acid rapeseed oil; and
   (b) about 97 to about 99 wt. % of a non-hydrogenated liquid vegetable oil which contains no solid fat at temperatures of 45° F. or above to provide a spread which is squeezable at about 35° F. to about 40° F. and the squeezable spread having a plastic consistency and a viscosity such that the squeezable spread retains its shape and does not flow freely under its own weight.

8. A squeezable spread according to claim 7, wherein the spread has a Brookfield viscosity of between 120,000 and 160,000 centipoises when measured at 41° F., with a type D-spindle rotated at 5 RPM.

* * * * *